United States Patent [19]

Takai et al.

[11] Patent Number: 5,077,670

[45] Date of Patent: Dec. 31, 1991

[54] SYSTEM AND METHOD APPLICABLE TO VEHICLES FOR COMMUNICATING BETWEEN DATA PROCESSING STATIONS

[75] Inventors: Hideo Takai; Tohru Futami, both of Kanagawa, Japan

[73] Assignee: Nissan Motor Company, Limited, Japan

[21] Appl. No.: 454,542

[22] Filed: Dec. 21, 1989

[30] Foreign Application Priority Data

Dec. 28, 1988 [JP] Japan .................................. 63-334671
Aug. 7, 1989 [JP] Japan .................................. 1-202884

[51] Int. Cl.$^5$ ...................... G01M 15/00; G06F 11/00
[52] U.S. Cl. ................................. 364/424.03; 371/70; 73/117.3
[58] Field of Search ...................... 364/424.03, 424.04; 73/117.2, 117.3; 307/9.1, 10.1; 370/85.11; 340/825.07, 825.08; 371/70

[56] References Cited

U.S. PATENT DOCUMENTS

| | | | |
|---|---|---|---|
| 4,368,534 | 1/1983 | Sibley | 371/70 |
| 4,599,723 | 7/1986 | Eck | 371/70 |
| 4,712,213 | 12/1987 | Warwick et al. | 371/70 |
| 4,748,843 | 6/1988 | Schäfer et al. | 73/117.3 |
| 4,907,176 | 3/1990 | Bahnick et al. | 364/424.03 |
| 4,926,330 | 5/1990 | Abe et al. | 364/424.03 |

*Primary Examiner*—Gary Chin
*Attorney, Agent, or Firm*—Lowe, Price, LeBlanc & Becker

[57] ABSTRACT

An off-board diagnostic device (master station) communicates with a plurality of electronic control units (subordinate stations) applicable to a vehicle. An initializing command (INIT) is transmitted by the diagnostic device to all electronic control units via a communication circuit. The master station (diagnostic device), then, transmits a system call command to the communication circuit to select a particular electronic control unit to be communicated with the master station. The selected electronic control unit returns a first echoback signal to the master station to inform the master station of the receipt of the system call command. Then, the master station transmits a control command (parameter set command) to the selected control unit to perform a predetermined control operation for a controlled obejct (e.g., vehicular engine). The selected control unit returns a second echoback signal to the master station in response to the control command. The master station, then, successively transmits at least two information signals to the selected control unit, the information signals being related to the control command. The selected control unit returns third and fourth echoback signals in response to the information signals to inform the master station of the receipt of each information signal. At this time, bit contents of the third and fourth echoback signals are determined depending on whether the bit contents of the first and second echoback signals are respectively the same as or logically opposite to those of the system call and control commands.

28 Claims, 5 Drawing Sheets

SYSTEM AND METHOD APPLICABLE TO VEHICLES FOR COMMUNICATING BETWEEN DATA PROCESSING STATIONS

BACKGROUND OF THE INVENTION (1) Field of the invention

The present invention relates to a system and method for communicating between data processing stations such as a master station (i.e., diagnostic device) and various substations (i.e., electronic control units installed in a vehicle) to diagnose trouble in one or each of the electronic control units (ECUs), e.g., a control unit for controlling, e.g., a vehicular engine.

(2) Description of the background art

Along with recent technological developments in semiconductor devices, essential vehicular components have rapidly become electronically controlled and a multiple number of microprocessors have found their way into most vehicles to be used as electronic control units (ECUs) such as engine control units.

Although such electronically controlled systems achieve high-performance and make more comfortable vehicles, trouble diagnoses in the control units are very complex. This is because it is often difficult to trace a causal relationship between a generated phenomenon and its cause, a high degree of technological knowledge is needed to analyze such causal relationships and intermittent discontinuities of such minute electrical signals are susceptible to external noises.

Therefore, although many electronic control units add self-diagnostic functions, since such diagnoses are carried out on an on-board basis, and the microprocessors of most ECUs are rather small, their processing capabilities are restricted.

In response to the above, a master station constituting an off-board diagnostic device which carries out the off-board diagnosis and which is capable of making precise, high-quality diagnoses has been developed.

In a case where each electronic control unit installed in the vehicle is diagnosed from the master station, the master station selects a desired electronic control unit from among the plurality of electronic control units installed in the vehicle, transmits a diagnostic control command to the selected electronic control unit, and receives returned data from the selected electronic control unit in response to the diagnostic control command.

In such a data communication as described above, the master station initially transmits an initializing command to set each electronic control unit via a communication circuit located between the master station and the plurality of the electronic control units and transmits an initializing command to place each electronic control unit in a receipt wait state for a system call command which will select the desired electronic control unit from among the plurality of electronic control units.

Upon transmission of the initializing command with the communication circuit initialized and each electronic control unit placed in the receipt wait state for the system call command, the master station transmits the system call command to select only the desired electronic control unit so that a data link from the master station to the selected electronic control unit is established.

When the data link is established between the master station and the selected electronic control unit, the master station transmits a control command such as a parameter set command, the control command being issued to command to cause the selected electronic control unit to a desired control operation. The selected control unit receives the control command and then returns an echoback signal to the master station, the echoback signal being logically opposite to the control command. The control command is followed by two information bytes, consecutively transmitted for each predetermined interval of time. At this time, an item to be controlled is set in a first information byte and a controlled variable on the item to be controlled is set in a subsequent second information byte. Then, the master station monitors the response characteristic of the vehicle, e.g., the vehicular engine controlled by the ECU to compare that the vehicle response correlates with the ECU parameter specified by the control command.

Diagnosis of malfunction in the ECU is carried out in this way. The selected ECU receives two information bytes, i.e., first and second information bytes and returns echoback signals whose bits are opposite to those of the two information bytes back to the master station whenever the selected control unit receives the two information bytes. Then, the master station confirms that the inverted echoback signals are received.

As described above, when the selected electronic control unit receives the first and second information bytes transmitted from the master station after the control command, the normally operating electronic control unit returns the echoback signals whose bit contents are logically opposite to those of the two information bytes back to the master station. In this case, if, e.g., the first information byte has the same bit contents as the initializing command and the second information byte has the same bit contents as the system call command which specifies one of the other ECUs to be selected to communicate with the master station, the non-selected control unit erroneously responds to the system call command. Consequently, since the erroneous echoback signal from the non-selected ECU has the same bit contents as the inverted echoback signal from the normally selected ECU, exactly the same two inverted echoback signals are received by the master station. Then, the master station cannot determine that the non-selected control unit erroneously outputs the echoback signal.

SUMMARY OF THE INVENTION

It is an object of the present invention to provide a system and method for communicating between each data processing station which can prevent an erroneous response from a non-selected electronic control unit and can make an appropriate communication to the normally selected electronic control unit.

The above-described object can be achieved by providing a communication system, comprising a) a plurality of subordinate data processing stations; b) a master data processing station; and c) a communication circuit interconnected between the master station and the plurality of subordinate stations, the master data processing station transmitting various commands and transmitting at least two information signals on a predetermined operation of any one of the subordinate data processing stations to the communication circuit, any one of the subordinate data processing stations which is assigned to communicate with the master station transmitting a first echoback signal to the master station to inform the master station of the receipt of each command and transmitting a second echoback signal to the master station of the receipt of each information signal, and bit contents of the second echoback signals being determined depending on whether the bit contents of the first echoback signals are the same as or logically opposite to those of the respectively corresponding commands.

The above-described object can also be achieved by providing a data communication system, comprising: a) a plurality of electronic control units (ECUs), each control unit carrying out a predetermined control operation to a controlled object; b) an off-board diagnostic device; c) a communication circuit interconnected between the diagnostic device and each control unit; d) first means, provided in the diagnostic device, for transmitting an initializing command via the communication circuit to the plurality of electronic control units to initialize the plurality of electronic control units so as to place the electronic control units in a receipt wait state for a system call command, transmitting the system call command via the communication circuit to select a desired one of the electronic control units to communicate between the selected control unit and the diagnostic device, and transmitting a control command to the selected control unit to execute a predetermined control operation and thereafter transmitting at least two information signals related to the control command and indicating the contents of the predetermined control operation; and e) second means, provided in the control unit selected in response to the system call command, for transmitting a first echoback signal to the diagnostic device in response to the system call command, a second echoback signal to the diagnostic device in response to the control command, a third echoback signal to the diagnostic device in response to each information signal, the data of the third echoback signals having the same bit contents as the information signals when the data of at least the second echoback signal is logically opposite to that of the control command.

The above-described object can also be achieved by providing a communication method, comprising the steps of a) providing a plurality of subordinate data processing stations; b) providing a master data processing station; c) providing a communication circuit interconnected between the master station and the plurality of subordinate stations; d) causing the master station to transmit various commands and transmit at least two information signals to the communication circuit, the information signals being related to a predetermined operation for any one of the subordinate data processing stations which is assigned to communicate with the master station; and e) causing the subordinate station to return a first echoback signal to the master station to inform the master station of the receipt of each command and to return a second echoback signal to the master station to inform the master station of the receipt of each information signal, bit contents of each second echoback signal being determined depending on whether the bit contents of each first echoback signal is the same as or logically opposite to that of the corresponding command.

DETAILED DESCRIPTION OF THE PREFERRED EMBODIMENTS

Reference will hereinafter be made to the drawings in order to facilitate a better understanding the present invention.

Figure 1:
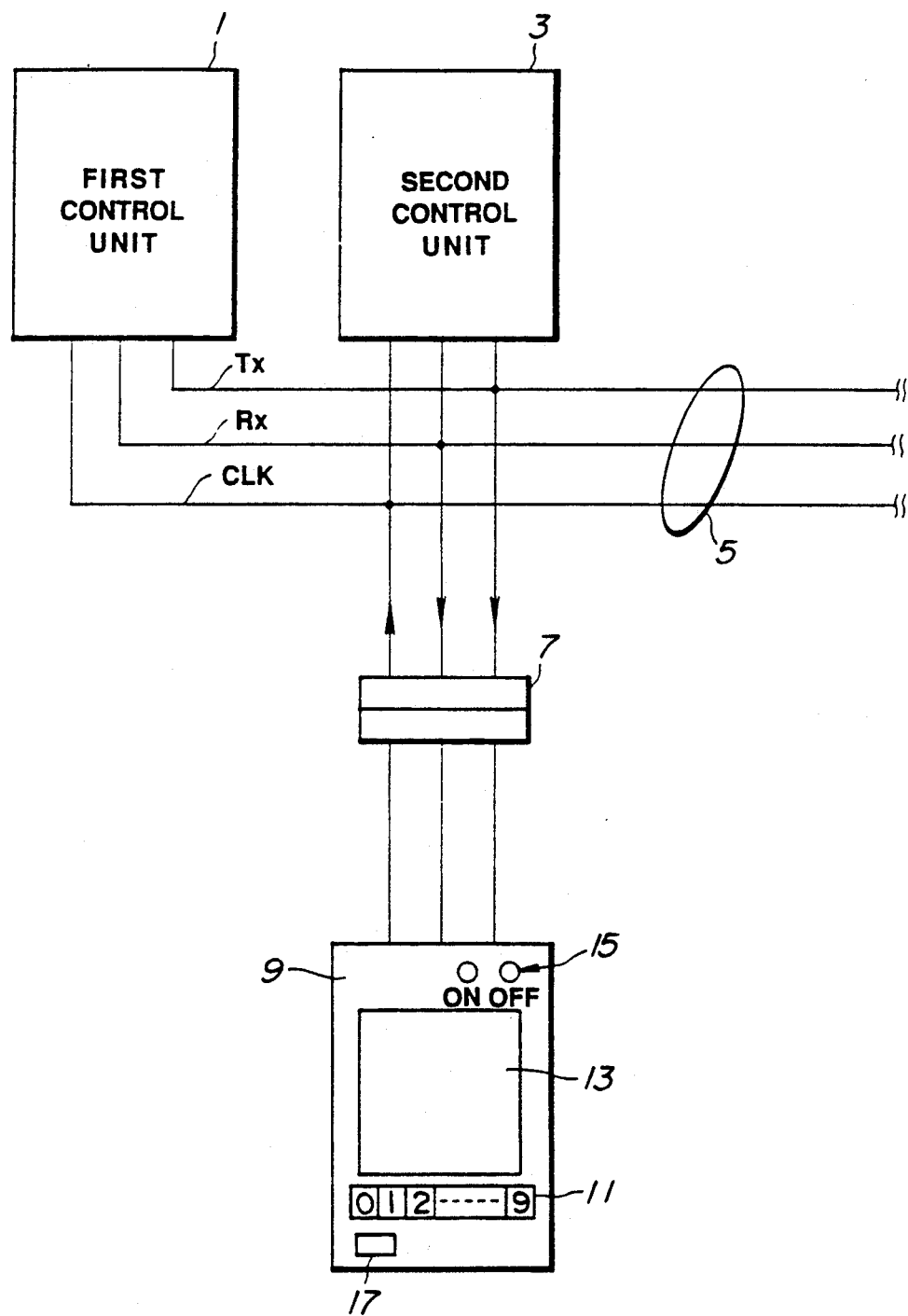
FIG. 1 is a schematic circuit block diagram of a system for communicating between each station applicable to a vehicle in a preferred embodiment according to the present invention.

FIG. 1 shows a preferred embodiment of a system for communicating between each data processing station applicable to a vehicle.

In FIG. 1, a plurality of control units 1, 3, —including electronic control units (ECU) such as engine control unit, A/T (automatic transmission) control unit, and so on which constitute a control portion of the vehicle are interconnected to a signal line 5, the signal line 5 having an ECU data transmission line Tx, ECU data reception line Rx, and clock line CLK. A master station 9 is connected to the plurality of control units 1, 3,—via the signal line 5 and a connector 7.

The master station 9 constitutes an off-board diagnostic device which diagnoses the control portion of the vehicle having the plurality of the control units, 1, 3,—.

The master station 9 includes a ten key pad 11, e.g., a keyboard, for inputting various kinds of information, a display 13 for displaying diagnostic information, a power supply switch 15, and an end key 17 for terminating a series of diagnostic operations to be described later.

It is noted that although FIG. 1 shows only two control units 1 and 3 (first and second control units), various kinds of other control units may be installed.

The master station 9 selects a desired one of the plurality of control units 1 and 3, transmits various diagnostic commands to diagnose the selected control unit, and receives the responding information to the corresponding commands so as to carry out the trouble diagnoses for the respective control units.

Figure 2:
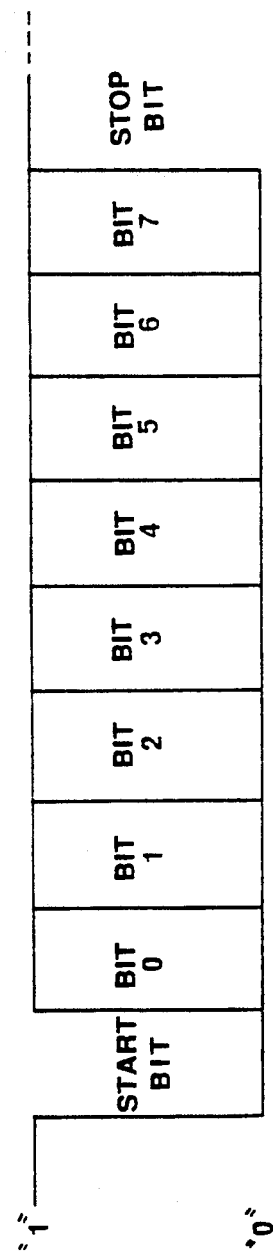
FIG. 2 is an explanatory view of a data format used in the communicating system in the preferred embodiment shown in FIG. 1.

In a data communication between master station 9 and respective control units in which the master station 9 transmits various commands to the respective control units to diagnose the respective control units and receives responding information, an NRZ (Non-Return to Zero) method is preferably used as a transmission path coding. A data modulation system, an UART (Universal Asynchronous Receiver/Transmitter) is built in the communication circuit to facilitate the ECU data transmission and reception. In addition, as a data format, a one-bit start bit ("0") is added to a head portion, then, an eight-bit data is inserted into a portion after the start bit, and finally a one-bit stop bit ("1") is added after the eighth bit of data, as shown in FIG. 2, thus constituting one command and information byte used for each communication. Furthermore, a polling/selection method is used as a transmission control method between the master station and each control unit, with the master station 9 being a main station and each control unit being a subordinate station. Because the polling/selection method employs point-to-point communication between the off-board diagnostic, device (master station) and the ECU selected, it has the advantage of more simpler protocol and ECU software than a multi-master method.

The master station 9 selects a desired control unit from among the plurality of control units 1 and 3 on the basis of the modulation method and transmission control method, transmits various types of commands and information bytes carrying out various diagnoses for the selected control unit, and receives an echoback signal responding to the diagnostic commands to carry out the diagnostic operation.

Control procedures to execute selection and diagnostic operation are divided into four phases 0 through 3 as shown in the following Table.

| Phase | Control Contents |
| --- | --- |
| 0 | Circuit (Bus) initialization & Link Termination |
| 1 | Control Unit Selection & Link Establishment |
| 2 | Diagnostic Mode Setting |
| 3 | Diagnosis Execution & Termination |

Next, an operation of the preferred embodiment will be described below with reference to the above-described Table, a timing chart shown in FIG. 3, and an operation table of FIG. 4 in a case where an engine revolution speed is changed.

Figure 3:
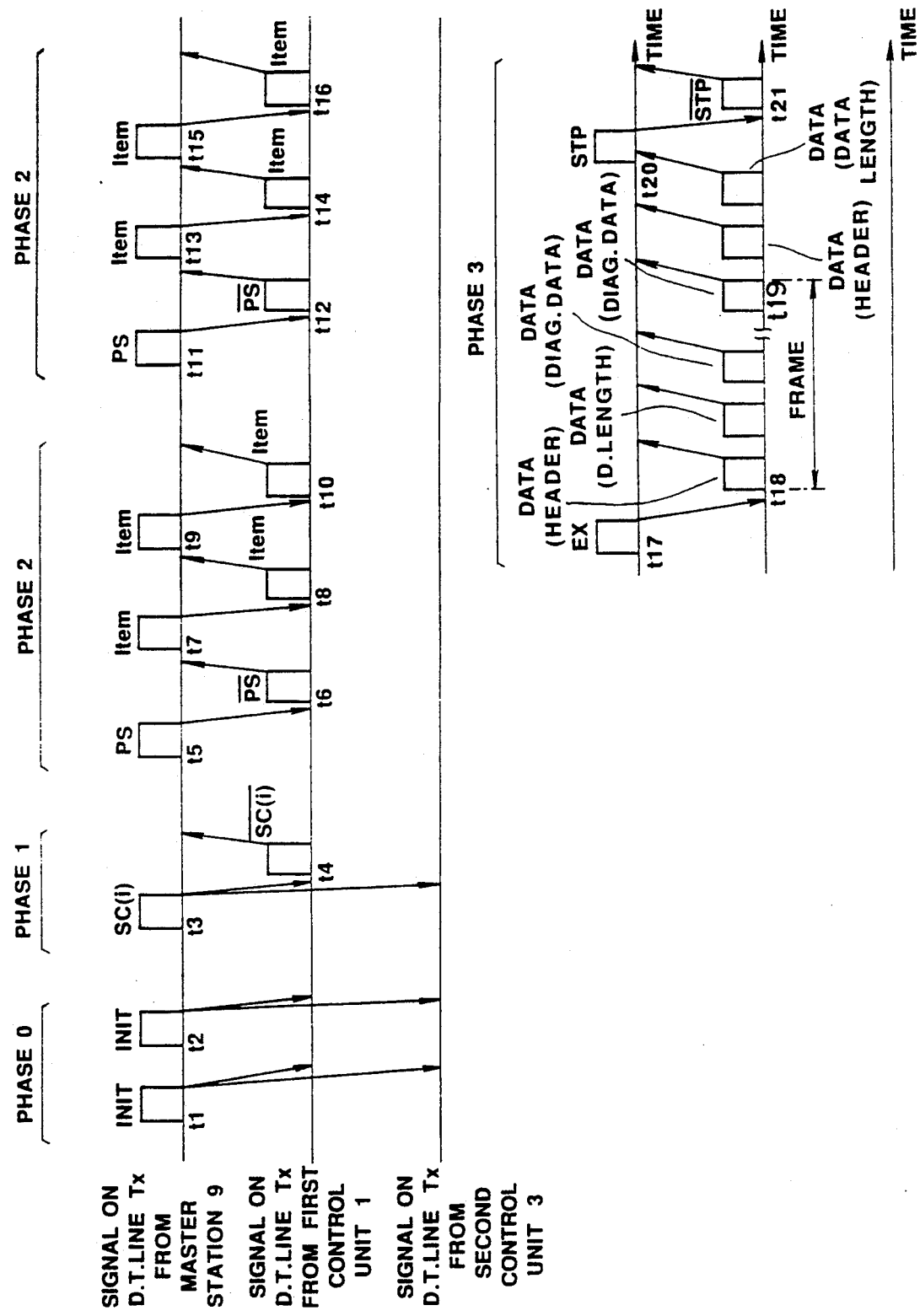
FIG. 3 is a timing chart indicating an operation of the communicating system shown in FIG. 1.

It is noted that each phase 0 through 3 defined in the above-described Table is denoted in a time axis in the lateral direction of the timing chart of FIG. 3 and the control procedures by means of the master station 9 are sequentially executed in accordance with each phase.

Figure 4:
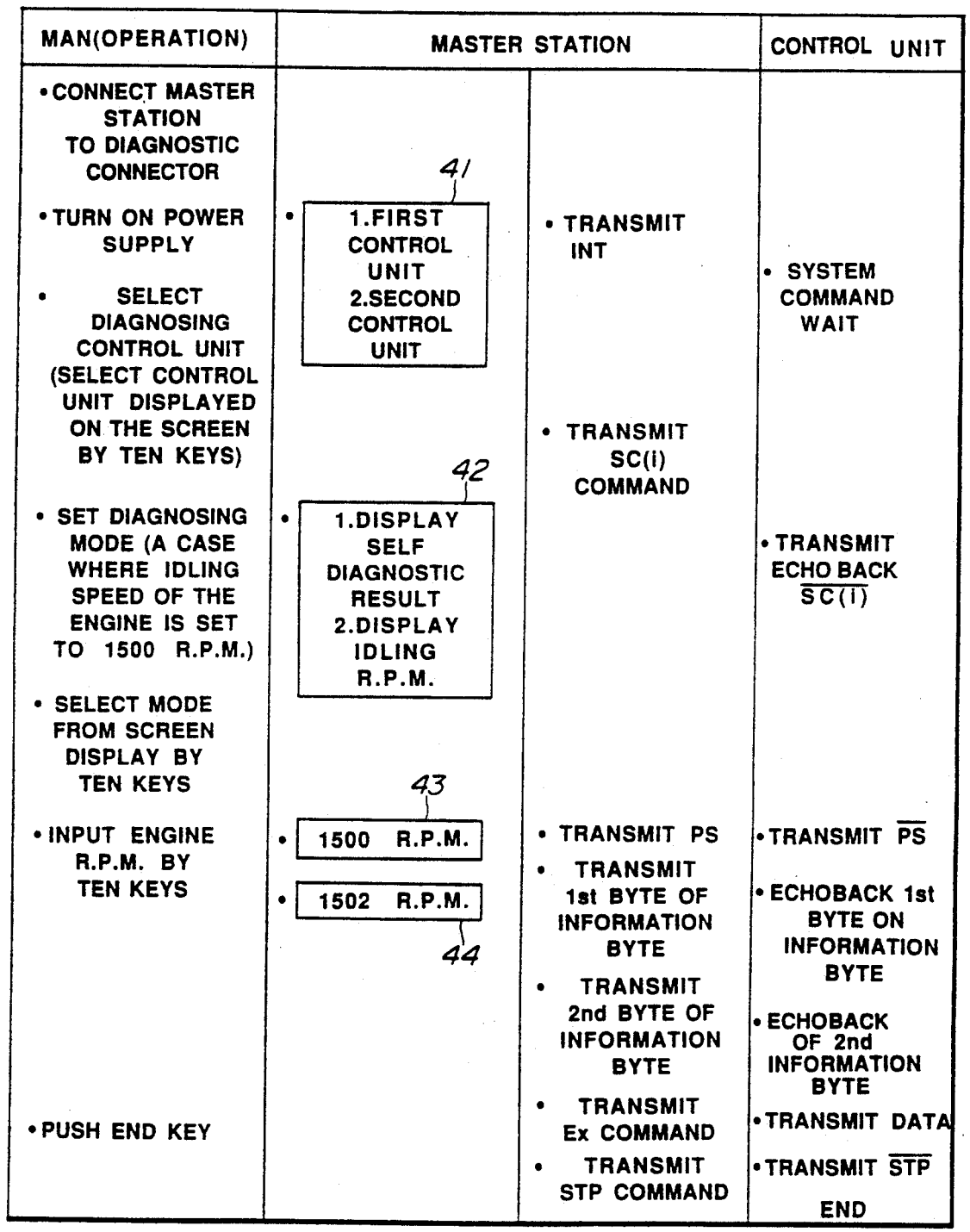
FIG. 4 is a table indicating an operation and action of the communicating system shown in FIG. 1.

First, in order to diagnose each control unit 1 and 3 using the master station 9, the connector 7 connects the master station 9 to each control unit 1 and 3, as described in an item of man (machine operation) of FIG. 4, and thereafter each power supply of both master station and each control unit 1 and 3 is turned on so as to operate the system for communicating between each station.

With the power supply turned on and the system in operation, the master station 9 enters the Phase 0. Then, "1. First Control Unit", "2, Second Control Unit", —are displayed which indicate all control units presently connected to the master station 9, as denoted by 41 in FIG. 4.

In addition, the master station 9 transmits an initializing command INIT at a time t1 of FIG. 3 in order to initialize the communication circuit and terminate a data link as will be described later.

Each control unit 1 and 3, upon receipt of the initializing command INIT, enters a receipt wait state for a system call command SC (i) to be described later, and the signal line 5, particularly, the data transmission line Tx thereof enters an idle state so that the circuit constituted by the signal line 5 is initialized.

If, at this time, the control unit whose data link is being established is present, the established control unit terminates the communication and enters the receipt wait state for the system call command SC (i).

As described above, when the communication circuit constituted by the signal line 5 is initialized and each control unit 1 and 3 enters the receipt wait state for the system call command, the master station 9 enters Phase 1. In this phase, the master station 9 is operated to select the desired control unit to be diagnosed from among the control units 1 and 3 by the operator through the ten key pad 11.

Therefore, the ten key pad 11 of the master station 9 is used to select a number assigned to the desired control unit.

One of system call commands SC (i) which corresponds to the selected number of the control unit is transmitted at a time shown by t3 of FIG. 3.

It is noted that FIG. 3 shows a case where the first control unit 1 is selected and the system call command SC (i) is transmitted from the master station 9 to the first control unit 1.

When the system call command SC (i) transmitted from the master station 9 is received by the selected first control unit 1, the selected first control unit 1 transmits its echoback signal SC (i) which is a reversed signal (logically opposite) of the corresponding system call command SC (i) in order to inform the master station 9 of the receipt of the system select command SC (i) at a time denoted by t4 of FIG. 3.

The master station 9 receives the reversed echoback signal SC (i) so that the reception of the system call command is confirmed by the selected control unit (first control unit 1).

When the master station 9 confirms that the reversed echoback signal is derived from the first control unit 1, the data link between the master station 9 and first control unit 1 is established.

It is noted that, at this time, the other control units, i.e., the second control unit 3 not selected is returned to the initializing command wait state and is held in the initializing command wait state until the subsequent initializing command (INIT) is received.

Hence, it becomes possible in communication that only the first control unit 1 selected under the establishment of data link can be communicated with the master station 9.

In this way, when the data link is established between the selected first control unit 1 and master station 9, the master station enters the Phase 2 to set a diagnostic mode. In this phase, a list of diagnostic functions which can be executed by the master station 9 are displayed on the display 13 of the master station 9 as denoted by 42 of FIG. 4.

To set the diagnostic mode in Phase 2, the master station 9 transmits one of the mode setting commands. Various commands are provided in the mode set commands, i.e., self-defined commands and control commands such as a parameter set command PS having, e.g., information bytes subsequent to the parameter set command PS.

The parameter set command PS is, e.g., a command to command the engine control unit 1 to set the engine in a particular state and, e.g., two information bytes subsequent to the command are continuously transmitted, at a predetermined time interval for each byte.

For example, in a case where an engine idling revolution speed is set at 1500 R. P. M., the master station 9 transmits two information bytes, the first information byte indicating "engine idling revolution speed" and the second information byte indicating" 1500 R. P. M.".

Hence, suppose that the operator selects the case where the engine idling revolution speed is set at 1500 R. P. M. as the diagnostic mode described above. The operator selects the diagnostic mode for the parameter set command from the display 13 of the master station 9 through the ten key pad 11.

In this case, the operator may specify the "engine revolution speed" and "1500 R.P.M." as the information bytes subsequent to the parameter set command through the ten key pad 11. At this time, the display 13 of the master station 9 displays "revolution speed" and "1500 R. P. M.", as shown by 43 of FIG. 4. Thereafter, the parameter set command PS is transmitted to the first control unit 1 from the master station 9, as shown by time t5 of FIG. 3.

The first control unit 1, upon receipt of the parameter set command PS from the master station 9, returns back the echoback signal $\overline{PS}$ which is the reversed signal of the parameter set command PS to confirm receipt of the parameter set command PS at a time denoted by t6 of FIG. 3 so that the first control unit 1 is placed in an information byte wait state. When the master station 9 confirms that the echoback signal transmitted from the first control unit 1 is the reversed data of the previously transmitted parameter set command PS, the master station 9 transmits the first information byte Item indicating "engine revolution speed" to the first control unit 1 at a time denoted by t7 of FIG. 3.

When the first control unit 1 receives the first information byte Item, the first control unit 1 returns back the echoback signal of the same data as the first information byte, i.e., the non-inverted echoback signal to the master station 9, at the time denoted by t8 of FIG. 3.

When the master station 9 confirms that the echoback signal from the first control unit 1 is the same as the previously transmitted first information byte, the second information byte Item indicating 1500 R. P. M. is transmitted to the first control unit 1 at the time denoted by t9 of FIG. 3.

The first control unit 1 receives the second information byte Item and then returns back the echoback signal of the same data as the second information byte Item previously transmitted to the master station 9 at a time t10 of FIG. 3 to terminate the set of the parameter set command PS.

In addition, suppose that the operator sets "increase a fuel injection quantity by 10%" after the engine revolution speed is set. The ten key pad 11 is, similarly, used to select the diagnostic mode for the parameter set command PS through the display 13 of the master station 9. Signals indicating "Fuel Injection Quantity" and numerical value corresponding to "10% increase" are keyed-in through the ten key pad 11.

In this way, after the echoback signals having the same bit contents of the information bytes related to the parameter set command PS are received by the master station 9, the master station 9 again transmits the parameter set command PS to the first control unit 1.

When the parameter set command PS is again transmitted at a time denoted by t11 of FIG. 3, the first control unit 1 returns back the echoback signal, i.e., the reversed signal $\overline{PS}$ of the present parameter set command PS to the master station 9 at a time t12 of FIG. 3.

Then, the first control unit 1 is in the state receiving the related information bytes. Upon receipt of the echoback signal from the first control unit 1, the master station 9 transmits the first information byte indicating "the fuel injection quantity" at a time t13 of FIG. 3 and returns back the echoback signal having the same data as the first information byte to the master station 9 at a time t14 of FIG. 3.

Upon confirmation that the echoback signal having the same data as the first information byte is received at the time t14, the second information byte Item indicating the "numerical data corresponding to 10% increase" is transmitted to the first control unit 1 at a time t15 of FIG. 3.

The first control unit 1 returns back the echoback signal having the same data as the second information byte to the master station 9 at a time t16 of FIG. 3.

When the master station 9 sets "the engine revolution speed" to 1500 R.P.M. and ends the diagnostic mode setting such that "the fuel injection quantity is increased by 10%". When the mode setting is terminated, the master station 9 enters Phase 3 and the diagnostic execution command EX as shown in time t17 of FIG. 3 is transmitted to the first control unit 1.

The first control unit 1 executes the control operation for the engine in response to the diagnostic execution command EX. That is to say, the execution contents are such as to execute the control values of "engine revolution speed = 1500 R. P. M." in response to the previous parameter set command and "fuel injection quantity = 10% increase" in response to the subsequent parameter set command, in the case described above. Then, as shown in FIG. 3, the diagnostic data on the engine revolution speed are repeatedly transmitted from the first control unit 1 to the master station 9 until the first control unit 1 transmits a diagnostic termination command STP.

The diagnostic data returned back in this way is returned back in one frame which is constituted by the data of one-byte header, one-byte data length indicating the length of the data to be transmitted thereafter, and the diagnostic data of 254 bytes or less, for a time interval from a time t18 to time t19 in FIG. 3.

The diagnostic data returned back from the first control unit 1 is received by the master station 9 and the received diagnostic data is displayed through the display 13 of the master station 9 as shown in FIG. 4. The control value is modified as prescribed and the normal operation of the relation to the engine is confirmed. It is noted that the engine revolution speed of the diagnostic data displayed on the display 13 is 1502 R. P. M. and this is determined to be a substantially normal value.

When the diagnostic data is obtained as described above, the operator pushes the end key 17 on the master station 9.

Upon pushing of the end key 17, the master station 9 transmits the diagnostic termination command STP to the first control unit 1 at a time denoted by t20 of FIG. 3.

Upon receipt of the diagnostic termination command, the first control unit 1 clears the control commands presently set and returns back an echoback signal $\overline{STP}$ which is logically opposite to the received diagnostic termination command STP to the master station 9 at a time denoted by t21 of FIG. 3.

Upon receipt of the reversed echoback signal $\overline{STP}$ from the first control unit 1, the diagnoses to the first control unit are terminated.

Figure 5:
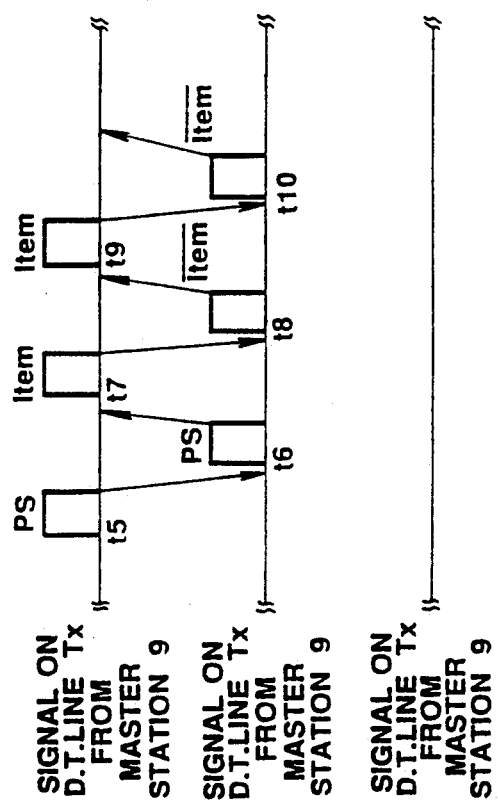
FIG. 5 is a timing chart of signals indicating an operation of the communication system in another preferred embodiment.

Although, in the preferred embodiment shown in FIGS. 1 through 4, the echoback signals for the corresponding information bytes are the same as the bit contents of the corresponding information bytes, the echoback signals may have the bit contents logically opposite to those of the corresponding information bytes if the echoback signals for the corresponding commands have the same bit contents as the corresponding commands. This is appreciated from FIG. 5. It is noted that although FIG. 5 shows Phase 2, the other phases are the same as those shown in FIG. 3 except the echoback signals for the commands which are the same as the corresponding commands.

As described hereinabove, in the system and method for communicating both master station and each control unit according to the present invention, the bit contents of the echoback signals for the corresponding information bytes are determined depending on whether the echoback signals for the corresponding commands are the same as or logically opposite to the corresponding commands. Specifically, the echoback signals for the information bytes are logically opposite to the corresponding information bytes when those for the commands associated therewith are the same as the commands, and are the same as the information bytes when those for the associated commands are logically opposite to the commands.

Therefore, even if the contents of the first information byte has the same bit contents as the initializing command and the second information byte has the same bit contents as the system call command which will select the other non-selected electronic control unit (e.g., second control unit), the master station recognizes the receipt of the information bytes by the selected control unit (first control unit) since the bit contents of the echoback signals for the information bytes are always different from those for the corresponding commands. In detail, the master station can determine that the selected control unit responds to the information bytes even when the non-selected control unit erroneously returns the echoback signals to the master station because of misunderstanding receipt of the initializing command and subsequent system call command.

It will be fully appreciated by those skilled in the art that the foregoing description has been made in terms of the preferred embodiment and various changes and modifications may be made in terms of the preferred embodiment which is to be defined by the appended claims.

What is claimed is:

1. A communication system, comprising:
    a) a plurality of subordinate data processing stations;
    b) a master data processing station; and
    c) a communication circuit interconnected between the master station and the plurality of subordinate stations, the master data processing station transmitting a command and at least two information signals related to said command to any selected one of the subordinate data processing stations via the communication circuit,
    a selected subordinate data processing station, when in communication with the master station, transmitting a first echoback signal to the master station to inform the master station of the receipt of said command and transmitting a second and third echoback signals to the master station to inform the master station of the receipt of said command and said first and second information signals;
    first means for determining the bit contents of said command and said two information signals, and second means for establishing the bit contents of said first echoback signal being logically opposite to the bit contents of said command when the bit contents of said second and third echoback signals are respectively identical to the bit contents of said two information signals.

2. A communication system as set forth in claim 1, wherein said second means operates to establish the bit contents of said first echoback signal to be identical to the bit contents of said command when the bit contents of said second and third echoback signals are respectively logically opposite to the bit contents of said two information signals.

3. A data communication system, comprising:
    a) a plurality of electronic control units (ECUs), each control unit carrying out a predetermined control operation to a controlled object;
    b) an off-board diagnostic device;
    c) a communication circuit interconnected between the diagnostic device and each control unit;
    d) first means, provided in the diagnostic device, for transmitting an initializing command via the communication circuit to the plurality of electronic control units to initialize the plurality of electronic control units by placing the electronic circuit units in a receipt wait state for a system call command, said first means further transmitting the system call command via the communication circuit to select a desired one of the electronic control units to establish communication between the selected control unit and the diagnostic device, and transmitting a control command to the selected control unit, said selected control unit including means for execution of the predetermined control operation to be carried out by said selected control unit and, said first means thereafter transmitting at least two information signals, being a first and a second information signal, related to the control command and indicating parameters related to the predetermined control operation; and
    e) second means, provided in each control unit, for allowing the control unit selected in response to the system call command, to transmit a first echoback signal to the diagnostic device in response to the system call command, a second echoback signal to the diagnostic device in response to the control command, at least a third and fourth echoback signals to the diagnostic device respectively in response to said first and second information signals, and
    f) establishing means for establishing the bit contents of at least one predetermined echoback signal, the data of the third and fourth echoback signals having respectively the same bit contents as the first and second information signals when the data of at least the second echoback signal is logically opposite to that of the control command.

4. A communication system as set forth in claim 3, wherein said establishing means further operates to establish the data of the third and fourth echoback signals to have bit contents logically opposite to those of the first and second information signals, respectively, when the bit content of at least the second echoback signal is the same as that of the control command.

5. A communication system as set forth in claim 3, wherein said establishing means further operates to establish the data of the first echoback signal to have bit contents logically opposite to that of the system call command.

6. A communication system as set forth in claim 3, wherein said establishing means further operates to establish the data of the first echoback signal to have bit contents the same as that of the system call command.

7. A communication system as set forth in claim 3, wherein the electronic control units include an engine control unit for controlling operation of a vehicle engine.

8. A communication system as set forth in claim 3, wherein the communication circuit includes a Universal Asynchronous receiver/transmitter(UART).

9. A communication system as set forth in claim 3, wherein the data transmitted in the communication circuit is modulated according to an NRZ (Non-Return-to Zero) method.

10. A communication system as set forth in claim 3, wherein said first means in the diagnostic device transmits the system call command to a selected control unit after the initializing command is transmitted to all control units.

11. A communication system as set forth in claim 7, wherein the diagnostic device transmits a parameter set command for controlling the control unit and wherein, responsive to said parameter set command the control unit thereafter transmits the second echoback signal, which is logically opposite to the parameter set command, back to the diagnostic device as confirmation of the receipt of the parameter set command.

12. A communication system as set forth in claim 11, wherein the information signals comprise data including an item for control by a selected control unit and parameter values related to said item for control when control of said item is carried out by said selected control unit.

13. A communication system as set forth in claim 12, wherein the diagnostic device transmits a diagnostic execution command to selected control unit after receipt of the third and fourth echoback signals from the engine control unit.

14. A communication system as set forth in claim 13, wherein the selected control unit transmits to the diagnostic device at least one frame of data including a header, data length, diagnostic data indicating a result of a diagnostic operation carried out in response to the diagnostic execution command from the diagnostic device.

15. A system as set forth in claim 13, wherein the diagnostic device transmits a diagnostic termination command to the engine control unit after the diagnostic data is received, the selected control unit transmitting responsively thereto a fifth echoback signal to the diagnostic device to inform the diagnostic device of the receipt of the termination command.

16. A communication system as set forth in claim 15, wherein said establishing means further operates to establish the data of the first, second and fifth echoback signals to be logically opposite to the commands to which they respond and to establish, the data of the third and fourth echoback signals to have the same contents as the respective information signals to which they respond.

17. A communication system as set forth in claim 15, wherein said establishing means further operates to establish the data of the first, second, and fifth echoback signals to be logically the same as the commands to which they respond, and to establish the data of the third and fourth echoback signals to be logically opposite to the information signals to which they respond.

18. A communication system as set forth in claim 15, wherein other control units including an automatic transmission control unit are placed in a system call command wait state after receipt of the initializing command from the diagnostic device.

19. A communication system as set forth in claim 18, wherein the diagnostic device includes a display for displaying the contents of information on the items to be controlled and a keyboard means for inputting information of the controlled value for the engine.

20. A communication system as set forth in claim 19, wherein the display displays the diagnostic data of the engine control unit as the result of the execution of the diagnostic execution command.

21. A communication system as set forth in claim 20, wherein the keyboard means is used to input the number assigned to one of the control units to be selected.

22. A communication system as set forth in claim 21, wherein the diagnostic device includes an end key to terminate the diagnostic operation carried out from the diagnostic device.

23. A communication system as set forth in claim 12, wherein said selected control unit is an engine control unit and said item for control to be controlled according to said parameter values is engine output.

24. A communication system, comprising:
a) a plurality of subordinate data processing stations;
b) a master data processing station; and
c) a communication circuit interconnected between the master station and the plurality of subordinate stations, the master data processing station transmitting various commands and at least two information signals on a predetermined operation of any one of the subordinate data processing stations which is assigned to communicate with the master station to the communication circuit, one of the subordinate data processing stations transmitting a first echoback signal to the master station to inform the master station of the receipt of each of the commands and transmitting a second echoback signal to the master station of the receipt of each information signal, including means for establishing bit contents of the second echoback signals to be respectively the same as those of the information signals when the bit contents of the first echoback signal is logically opposite to that of the corresponding command, and to be respectively opposite to those of the information signals when the bit contents of the first echoback signal is the same as that of the corresponding command.

25. A communication method, comprising the steps of:
a) providing a plurality of subordinate data processing stations;
b) providing a master data processing station;
c) providing a communication circuit interconnected between the master station and the plurality of subordinate stations;
d) causing the master station to transmit various commands and to transmit at least two information signals to the communication circuit, the information signals being related to a predetermined operation for any one of the subordinate data processing stations which is assigned to communicate with the master station; and
e) causing the subordinate station to return a first echoback signal to the master station to inform the master station of the receipt of each command and to return a second echoback signal to the master station to inform the master station of the receipt of each information signal, bit contents of each second echoback signal being determined depending on whether the bit contents of each first echoback signal is the same as or logically opposite to that of the corresponding command, wherein the bit contents of the second echoback signal are the same as those of the information signal when the bit contents of the first echoback signal are logically opposite to those of the corresponding command.

26. A communication method as set forth in claim 25, wherein the bit contents of the second echoback signal are logically opposite to those of the information signal when the bit contents of the first echoback signal are the same as those of the corresponding command.

27. A communication method, comprising the steps of:
   a) providing a plurality of subordinate data processing stations;
   b) providing a master data processing station;
   c) providing a communication circuit interconnected between the master station and the plurality of subordinate stations;
   d) causing the master station to transmit various commands and to transmit at least two information signals to the communication circuit, the information signals being related to a predetermined operation for any one of the subordinate data processing stations which is assigned to communicate with the master station; and
   e) causing the subordinate station to return a first echoback signal to the master station to inform the master station of the receipt of each command and to return a second echoback signal to the master station to inform the master station of the receipt of each information signal, bit contents of each second echoback signal being determined depending on whether the bit contents of each first echoback signal is the same as or logically opposite to that of the corresponding command, said step of causing the subordinate station to return said first and second echoback signals to the master station comprising the further steps of:
   i) establishing first and second logical relationships between the echoback signals and the commands and information signals, said first logical relationship defining a logical relationship between said first echoback signal and a command, said second logical relationship defining a logical relationship between said second echoback signal and an information signal, and
   ii) defining said first and second logical relationships to be logically opposite to one another, said defining step comprising the further step of defining said first logical relationship to provide said first echoback as a logical opposite of a command transmitted from the master station and defining said second logical relationship to provide said second echoback signal the same as the information signal.

28. A communication method as set forth in claim 27, wherein said defining step further comprises the step of defining said first logical relationship to provide said first echoback signal the same as a command transmitted from said master station and defining said second logical relationship to provide said second echoback signal as a logical opposite to said information signal.

* * * * *